(No Model.)
O. ROREM.
HARROW.
No. 399,564. Patented Mar. 12, 1889.
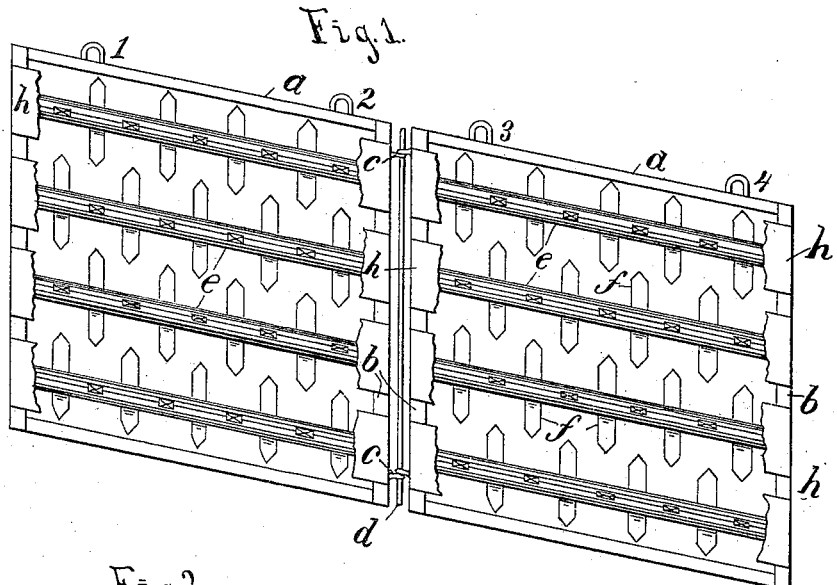
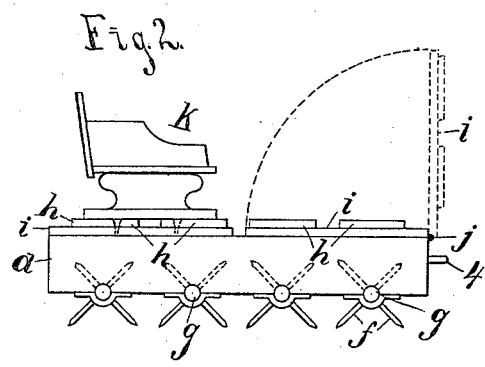
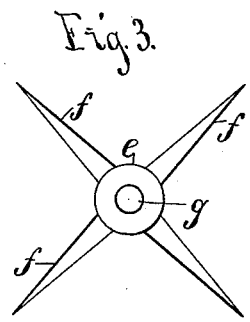
Witnesses:
H. A. Smith.
T. Vogel.
Inventor:
Ommund Rorem.
By Wm Zimmerman
Attorney.

UNITED STATES PATENT OFFICE.

OMMUND ROREM, OF ELLIOTT, ILLINOIS.

HARROW.

SPECIFICATION forming part of Letters Patent No. 399,564, dated March 12, 1889.

Application filed June 9, 1888. Serial No. 276,600½. (No model.)

*To all whom it may concern:*

Be it known that I, OMMUND ROREM, a citizen of Norway, residing at Elliott, in the county of Ford and State of Illinois, have invented certain new and useful Improvements in Harrows, which are fully set forth in the following specification, reference being had to the accompanying drawings, forming a part hereof, and in which—

Figure 1 is a plan view of my improved harrow with part of the covering and seat removed, so as to show the mechanism below it. Fig. 2 shows my harrow in end elevation. Fig. 3 shows one of the toothed revolving cylinders of my harrow in end elevation.

Like letters of reference indicate like parts.

The object of my invention is to construct a harrow with revolving teeth, which shall be easier of draft, less liable to clog, and better adapted to pulverize the soil than like harrows heretofore so constructed, together with other features, as hereinafter more fully set forth and claimed.

In Fig. 1 the covering-boards $h$ are all broken away, except small fragments of their ends, so as to show the cylindrical bars $e$ beneath, which are provided with a series of flat steel teeth, $f$. Said teeth $f$ are pointed at each end with a flat pyramidal point, as shown, and are passed through the axes of said bars or cylinder, so that each succeeding tooth shall stand at right angles to the preceding one, and, also, so that the flat side of said teeth shall be parallel with the axis of said cylinder. Said cylinders are usually made of wood and provided with iron or steel gudgeons turning in suitable boxes on the lower edges of the end pieces, $b$, of the frame of the harrow. Said frame or frames of the harrow are made of plank set edgewise, so as to form a frame above the teeth $f$ high enough to allow said teeth room to revolve freely beneath and within said frames, and on the upper edges of said frames are secured covers formed of strips or cleats $i$, upon which are fastened stout boards $h$. The rear boards forming said covering are securely fastened to the harrow-frame, so as to give greater rigidity, and in front of them the said covering is loose and held by hinges $j$, so that it may be raised for the purpose of examining and cleaning the teeth, as shown in Fig. 2. A spring-seat, $k$, is also attached to the fixed top or covering boards. The said pieces $a\ b$ form a parallelogram, of which one end or side $b$ of the parallelogram is behind the other side $b$ in about the proportion of one space for a width of five.

In the drawings the harrow is shown to be formed of two sections united by the well-known hinge-joint formed of the staple $c$ and rod $d$.

To the front of the harrow are attached draft-hooks 1 2 3 4, by means of which the angle of the revolving cylinders relative to the line of draft may be varied, it being greatest from the hook 1 and least at hook 3, the cylinders being there about at right angles to the line of draft, and at hook 4 the angle to the line of draft is reversed from that obtained at the hooks 1 and 2. By means of said hooks the tendency of causing said cylinders to revolve is made to vary and to cause the teeth to drag more or less, thereby performing both as drag-teeth and revolving spaders and pulverizers, by means of which great and desirable advantages are attained, because the soil may be deeply stirred when the cylinders revolve at right angles to the line of draft, because the teeth then act as spades, going deeply into the soil and loosening it, and when the draft is from near the end of the cylinders the tendency to revolve is diminished and the teeth run more on the surface and present their narrower sides, so as to scratch and stir the soil less deeply.

What I claim is—

A harrow formed of a parallelogram frame of plank, $a\ d$, set edgewise in a vertical plane, to the lower edge of which are secured boxes, in which revolve cylinders $e$, parallel to the front side, $a$, which are provided with flat teeth having short pyramidal points, the teeth passing through said cylinder at right angle each to the preceding, and the plane of their flat sides parallel with the axis of the cylinder, with draft-hooks 1 2 3 4 placed in the front side and pitched as shown, and fixed covering-planks, in combination with a hinged cover, substantially as specified.

OMMUND ROREM.

Witnesses:
WM. ZIMMERMAN,
T. VOGEL.